(12) United States Patent
Schröder et al.

(10) Patent No.: US 11,304,367 B2
(45) Date of Patent: Apr. 19, 2022

(54) AGRICULTURAL WORKING MACHINE

(71) Applicant: CLAAS Selbstfahrende Erntemaschinen GmbH, Harsewinkel (DE)

(72) Inventors: Axel Schröder, Gütersloh (DE); Arthur Berger, Bissendorf (DE); Lennart Meyer, Aachen (DE); Sascha Dieckmeyer, Melle (DE); Carsten Grove, Beelen (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 326 days.

(21) Appl. No.: 16/378,777

(22) Filed: Apr. 9, 2019

(65) Prior Publication Data
US 2019/0307068 A1 Oct. 10, 2019

(30) Foreign Application Priority Data
Apr. 10, 2018 (DE) .......................... 102018108494.3

(51) Int. Cl.
*A01D 41/12* (2006.01)
*A01D 41/127* (2006.01)
(Continued)

(52) U.S. Cl.
CPC .......... *A01D 41/127* (2013.01); *G05B 13/04* (2013.01); *G05B 19/042* (2013.01);
(Continued)

(58) Field of Classification Search
CPC .................................................. A01D 41/127
See application file for complete search history.

(56) References Cited

U.S. PATENT DOCUMENTS 5,712,782 A * 1/1998 Weigelt ................ A01B 79/005
701/24
5,995,895 A * 11/1999 Watt ..................... A01B 79/005
701/50
(Continued)

FOREIGN PATENT DOCUMENTS

DE 19514223 A1 10/1996
DE 102009009767 A1 8/2010
(Continued)

OTHER PUBLICATIONS

European Search Report for European Patent Application No. 19155632.3-1006 dated Sep. 11, 2019.

*Primary Examiner* — Alex C Dunn
(74) *Attorney, Agent, or Firm* — Lempia Summerfield Katz LLC

(57) ABSTRACT

An agricultural working machine with a driver assistance system is disclosed. The driver assistance system controls driving functions of the agricultural working machine and at least one working assembly of the agricultural working machine in the context of performing a work process. The driver assistance system accesses a set of rules in the form of control strategies to control the at least one work assembly according to a specific control strategy. The driver assistance system includes an interface to communicate with an external computer unit, which is remote from the agricultural working machine, and through which data can be exchanged between the driver assistance system and the external computer unit. For example, the driver assistance system receives data from the external computer unit via the interface during the work process of the agricultural working machine, and selects the control strategy for performing the work process based on the data.

20 Claims, 2 Drawing Sheets

(51) Int. Cl.
 *G05B 13/04* (2006.01)
 *G05B 19/418* (2006.01)
 *G05B 19/042* (2006.01)

(52) U.S. Cl.
 CPC .................... *G05B 19/4183* (2013.01); *G05B 2219/31464* (2013.01); *G05B 2219/45003* (2013.01)

(56) References Cited

U.S. PATENT DOCUMENTS

| | | | |
|---|---|---|---|
| 6,863,604 B2* | 3/2005 | Behnke | A01D 41/127 460/6 |
| 7,516,244 B2* | 4/2009 | Kelly | H04L 12/4625 370/252 |
| 8,406,964 B2* | 3/2013 | Baumgarten | A01D 41/127 701/50 |
| 8,935,060 B2 | 1/2015 | Baumgarten et al. | |
| 9,043,956 B2* | 6/2015 | Baumgarten | B60K 28/06 |
| 9,220,196 B2* | 12/2015 | Baumgarten | A01D 41/127 |
| 9,516,812 B2* | 12/2016 | Baumgarten | A01D 41/1243 |
| 9,521,806 B2* | 12/2016 | Takahara | G06Q 50/02 |
| 9,861,040 B2* | 1/2018 | Bonefas | A01D 43/073 |
| 10,114,348 B2* | 10/2018 | Gilmore | G05B 13/04 |
| 10,143,134 B2* | 12/2018 | Takahara | G06Q 50/02 |
| 10,448,569 B2* | 10/2019 | Baumgarten | C12C 7/01 |
| 10,905,046 B2* | 2/2021 | Inoue | G06Q 50/02 |
| 2004/0122894 A1 | 6/2004 | Wippersteg | |
| 2010/0217474 A1 | 8/2010 | Baumgarten et al. | |
| 2012/0004812 A1* | 1/2012 | Baumgarten | A01D 41/127 701/50 |
| 2016/0309656 A1 | 10/2016 | Wilken | |

FOREIGN PATENT DOCUMENTS

| | | |
|---|---|---|
| DE | 102010017676 A1 | 1/2012 |
| EP | 1403799 A1 | 3/2004 |
| EP | 2687923 A2 | 1/2014 |
| EP | 3085221 A1 | 10/2016 |

\* cited by examiner

AGRICULTURAL WORKING MACHINE

CROSS REFERENCE TO RELATED APPLICATION

This application claims priority under 35 U.S.C. § 119 to German Patent Application No. DE 102018108494.3, filed Apr. 10, 2018, the entire disclosure of which is hereby incorporated by reference herein.

TECHNICAL FIELD

The technical field relates to an agricultural working machine. More specifically, the technical field relates to a driver assistance system for an agricultural working machine.

BACKGROUND

Example agricultural working machines include tractors or harvesters. Driver assistance systems facilitate control of the agricultural working machines, with the driver assistance systems controlling one or more aspects of the agricultural working machines, such as driving functions of the agricultural working machine (e.g., one or more motors to drive one or more functions of the agricultural working machine) and/or at least one work assembly of the agricultural working machine in the context of the agricultural working machine performing a work process (e.g., one or more motors for the work assembly to perform a work process). In so doing, the operator may be guided by the driver assistance system to adjust the control by entering external information into the driver assistance system, with the driver assistance system controlling the agricultural working machine accordingly. Such a driver assistance system for a harvester is described in DE 10 2009 009 767 A1 (corresponding to US Patent Application Publication No. 2010/0217474, incorporated by reference herein in its entirety).

EP 1 403 799 A1 (corresponding to US Patent Application Publication No. 2004/0122894, incorporated by reference herein in its entirety) discloses a system in which data is exchanged between the agricultural working machine and for example a processor in order to better manage the entire process, including further processing the harvested material.

DESCRIPTION OF THE FIGURES

The present application is further described in the detailed description which follows, in reference to the noted plurality of drawings by way of non-limiting examples of exemplary implementation, in which like reference numerals represent similar parts throughout the several views of the drawings, and wherein.

DETAILED DESCRIPTION

Figure 1:
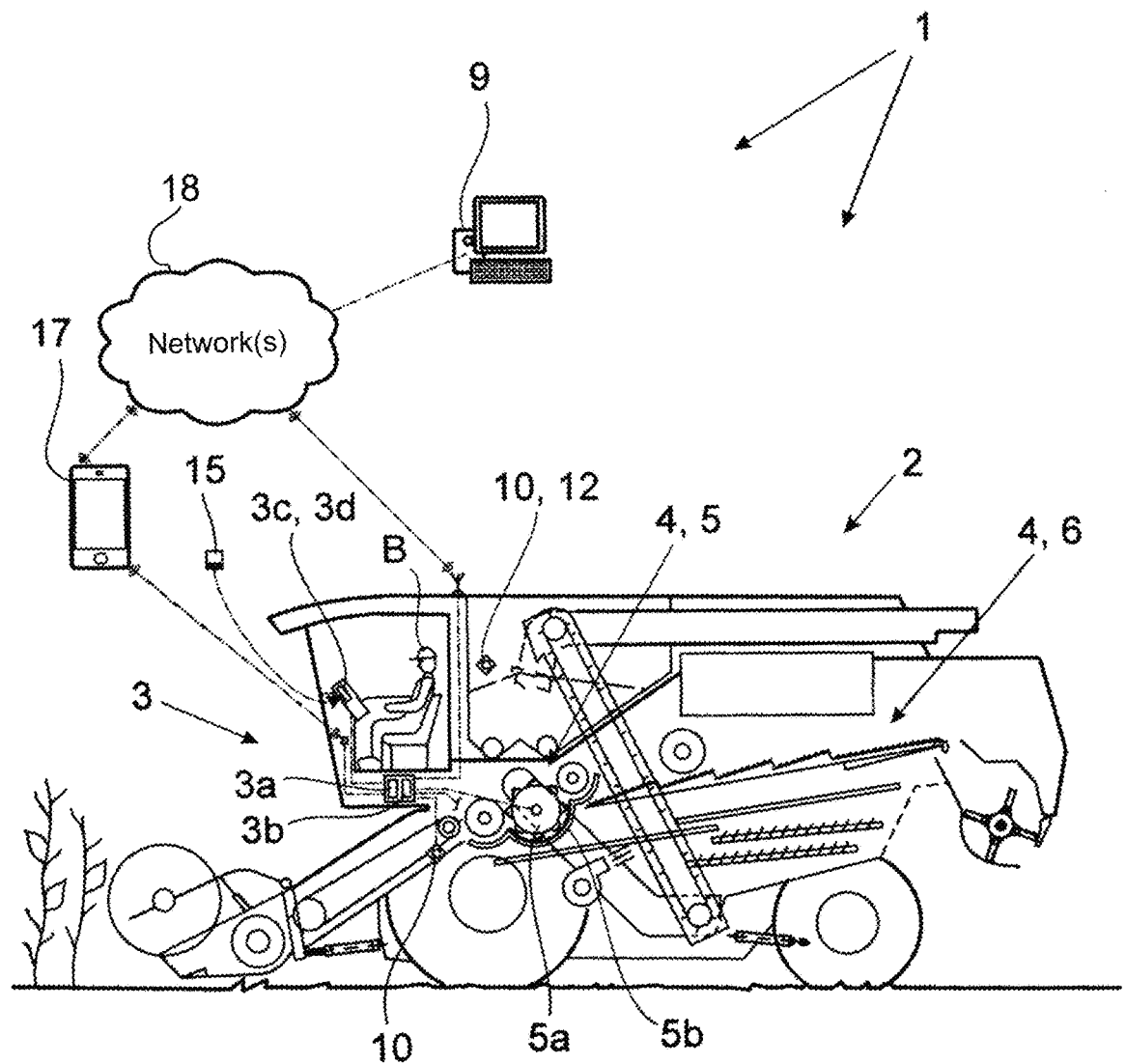
FIG. 1 shows one example of a system, with the system including an example agricultural working machine (illustrated in side view).

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

Driver assistance systems may make control of the work process easier; however, a driver assistance system that relies on manual operator entries may distract the operator during the work process.

In previous driver assistance systems, the operator of the agricultural working machine needed to manually adapt the control strategies in the driver assistance system. For example, a data exchange system, which may be external to the agricultural working machine, sent external information to the operator of the agricultural working machine. Previously, the driver assistance system was dependent on the operator's input to account for such external information (e.g., responsive to the operator receiving the external information, the operator modifies the entry of settings in the driver assistance system).

In contrast, a system is disclosed that facilitates and improves the control of the agricultural working machine by the driver assistance system and the operation thereof. In one implementation, an agricultural working machine (such as a harvester) includes a driver assistance system configured to control driving functions of the agricultural working machine and at least one working assembly of the agricultural working machine in the context of performing a work process. Specifically, the driver assistance system access a memory that stores a set of rules, with the rules being indicative of a plurality of control strategies, and with the driver assistance system using the set of rules in order to control the at least one work assembly according to one of the control strategies. Further, the driver assistance system may include an interface configured to communicate with an external computer unit that is arranged or positioned remotely from the agricultural working machine so that data may be exchanged between the driver assistance system and the external computer unit. In particular, the driver assistance system, via the interface, may receive data from the external computer unit during the work process of the agricultural working machine, with the driver assistance system using the received data in order to select the control strategy for performing the work process. Alternatively, or in addition, the driver assistance system may transmit data, via the interface, to the external computer unit as discussed further below.

Thus, since the driver assistance system includes an interface to communicate with the external computer unit (which is arranged remote from the agricultural working machine) and since external data can be exchanged between the driver assistance system and the external computer unit (e.g., the external computer unit transmits the data to the driver assistance system and/or vice versa), the external data may be provided to the driver assistance system and/or to the operator in an easier manner.

Further, since the driver assistance system receives the data, transmitted from the external computer unit via the interface during the work process of the agricultural working machine, and since the driver assistance system selects the control strategy for performing the work process dependent on the transmitted data, a direct and easier improvement or optimization of the adjustment of the agricultural working machine is implemented. In particular, external environmental knowledge (that may be dependent on data outside of the agricultural working machine and that influences the work process and/or expert knowledge specific to the work process) may be provided and accounted for more easily. This may enable the driver assistance system to select the proper control strategy, thereby improving the work process quality and the work of the agricultural working machine. In particular, the decision made by the driver assistance system may depend on the data sent from the external computer unit. For example, the driver assistance system may select the control strategy based on the data transmitted from the external computer unit. In practice, the external computer unit may need to transmit only a small amount of data to the driver assistance system. Thus, in one implementation, because the driver assistance system is resident on the agricultural working machine (as opposed to outsourcing the driver assistance functionality to a device external to the agricultural working machine) and because the driver assistance system need only be influenced by the external data, a high data transmission volume may not be necessary. Such a configuration (in which a small amount of external data may be used to influence the decisions of the driver assistance system) may be used in a variety of contexts, such as in certain agricultural regions which may lack high data transmission rate capability.

In one implementation, the agricultural working machine includes at least one sensor whose measured values are monitored using a sensor monitor, and wherein the driver assistance system's selection of the control strategy for performing the work process is also dependent on the measured values (optionally in addition to the external data received).

Various types of external data transmitted from the external computer unit to the driver assistance system are contemplated. As one example, the external data may comprise environmental information (e.g., indicative of a current environment of the working machine), which the driver assistance system may use to select the work process. As another example, the external data (upon which the driver assistance system may make its selection of the work process) may comprise any one, any combination or all of: cloud data; setting guidelines for the agricultural working machine; setting guidelines for a reference machine; or fleet data. Further, in one implementation, the external data and the measured values (e.g., values generated using sensors resident on the agricultural working machine) may be analyzed in combination. As one example, the external data and the measured values may both be input to an optimizer of the driver assistance system in order for the driver assistance system to select the work process based on both inputs. In this regard, the transmitted data and the measured values are input to the optimizer of the driver assistance system in a similar manner. Specifically, the optimizer may comprise an optimization algorithm that selects and parameterizes a control strategy, based on one or both of the external data and the measured values, from the list of rules (which may be stored in a memory of the driver assistance system).

Various triggers for the driver assistance system to select the control strategy are contemplated. The driver assistance system may be triggered to select the control strategy for performing the work process depending on any one, any combination, or all of: receipt of external data; receipt of the measured values; or operator input. For example, the trigger to select the control strategy may be dependent on one or both of the transmitted external data and/or the measured values. Alternatively, or in addition, the trigger for the control strategy selection may be dependent on transmitted (or yet to be transmitted) external data, measured values, and/or operator input.

In one implementation, data may also be transmitted from at least a part of the agricultural working machine (such as the driver assistance unit) via the interface to the external computer unit. In this way, the external computer unit may evaluate the data transmitted. For example, the data transmitted may comprise any one, any combination, or all of: the measured values generated by the sensor(s) resident on the agricultural working machine; setting data from the at least one work assembly, or parameterizations of the control strategy.

In one implementation, the driver assistance system includes at least one memory and at least one computing unit. For example, the driver assistance system may include a memory in which the set of rules is saved, and/or a computing unit through which control of one or more aspects of the agricultural working machine are implemented (e.g., the driving functions of the agricultural working machine and/or operation of at least one work assembly (4) of the agricultural working machine are controlled). In one implementation, the driver assistance system includes a user interface with a display unit. Various information may be displayed on the display unit, such as the state(s) of various parts of the agricultural working machine. Alternatively, or in addition, the operator may control one or more settings (e.g., the driving function) of the at least one work assembly via the user interface (which may comprise a touch screen).

In one implementation, the driver assistance system may receive, from a storage medium, additional data via the interface, and the driver assistance system may select the control strategy for performing the work process based on this additional data.

Moreover, the agricultural working machine and the external computer unit may be part of a system, such as a system consisting of these two elements. Thus, any discussion regarding the agricultural working machine described herein may be used in conjunction with the external computer unit to form the system (such as in combination with other elements or only consisting these two elements). Thus, the agricultural working machine of the system may have all the features described in conjunction with the agricultural working machine individually or in combination.

In one implementation, the external computer unit operates a cloud service that provides the data to be transmitted to the driver assistance system. In one implementation, the data transmitted by the external computer unit may be dependent on which the control strategy the driver assistance system to perform the work process. Alternatively, or in addition, the data transmitted by the external computer to the driver assistance system may determine the driver assistance system's selection of the control strategy.

In one implementation, the external computer unit (e.g., the cloud service) generates the data to be transmitted depending on which control strategy is selected and transmits the data to the driver assistance system. In turn, the driver assistance system processes the data received from the external computer unit, such as the driver assistance system selecting the control strategy in the context of the driver assistance system's processing.

As one example, the external computer unit may have access to different sources of data (which may be received from one or more service providers). The external computer unit may select a subset of the data that is available from the one or more service providers for transmission to the driver assistance system based on the control strategy selected. Alternatively, or in addition, the external computer unit prepares data (such as from one or more service providers)

using an algorithm and dependent on the control strategy selected, and transmits the prepared data to the driver assistance system.

In one implementation, the system includes a mobile data transmission device on which external data can be selected as the data to be transmitted to the driver assistance system.

Referring to the figures, FIG. 1 shows one example of a system 1, with the system including an example agricultural working machine 2 in side view. In one implementation, the agricultural working machine 2 is a harvester, such as a combine. Alternatively, the harvester can also be a forage harvester or the like. Furthermore, the agricultural working machine 2 may be an agricultural prime mover, such as a tractor or the like. In this regard, various types of agricultural working machines are contemplated.

The agricultural working machine 2 has a driver assistance system 3 that controls various aspects of the agricultural working machine, such as one or both of driving functions of the agricultural working machine 2 and at least one work assembly 4 (such as a plurality of work assemblies) of the agricultural working machine 2 in the context of performing a work process. In one implementation, the work assembly 4 comprises such assemblies of the agricultural working machine 2 that directly contribute to the work process thereof and influence it. In one implementation, driving functions, such as steering or driving the units providing the agricultural working machine, are not considered work assemblies 4.

In one implementation, the work assembly 4 may be an internal work assembly 4 of the agricultural working machine 2. Alternatively, the work assembly 4 may be an external work assembly 4, such as an attachment. Further, one or more work assemblies may be included in the agricultural working machine 2, such as multiple internal, multiple external, or a combination of internal and external work assemblies. In one implementation, the work assembly 4 is a threshing system 5 for threshing gathered harvested material into grains. The threshing system 5 is equipped with a threshing drum 5a that interacts with a threshing concave 5b. In terms of processing, a separating device 6 is downstream from the threshing system 5. In this regard, the separating device may also represent a work assembly 4 of the agricultural working machine 2. The stream of harvested material supplied to the threshing system 5 is therefore then supplied to the separating device 6 without the obtained grains.

The at least one work assembly 4, such as the threshing system 5, may be controlled by specifying various assembly parameters. In one implementation, an assembly parameter comprises a set value for the work assembly, e.g., an assembly setting. Depending on the design of the threshing system 5, this may include, for example, one or more parameters including any one or all of: the concave width (e.g., the distance between a threshing drum 5a and a threshing concave 5b); or drive parameters such as a drum rotational speed or other movement characteristic numbers of the threshing drum.

The driver assistance system 3 may control one or more aspects of the agricultural working machine 2. For example, the driver assistance system 3 may control the agricultural working machine 2 according to one or more operating strategies. In one implementation, an operator B may select the operating strategy from a plurality of available operating strategies. Example operating strategies may include for example any one, any combination, or all of: "maximization of throughput"; "minimization of fuel consumption"; or "maximization of threshing quality". With regard to the driver assistance system 3, reference is made to EP 2 687 923 A2 (corresponding to U.S. Pat. No. 8,935,060, incorporated by reference herein in its entirety) that describes the processing strategies and their selection by the operator.

The driver assistance system 3 may include (or may have access to) a set of rules 7 in the form of or indicative of control strategies that may, in particular, be parameterized and that may be saved in the driver assistance system 3. For example, different control strategies for the work assembly 4 may be saved in the set of rules 7 in the driver assistance system 3 (e.g., with a subset of rule(s) correlated to a respective control strategy). On the basis of the set of rules, the driver assistance system 3 may control the at least one work assembly 4 according to a respective control strategy.

In one implementation, the driver assistance system 3 has a memory 3a. The set of rules 7 is saved in this memory 3a. Furthermore, the driver assistance system 3 may include a computing unit 3b through which the driver assistance system 3 may control one or both of the driving function of the agricultural working machine 2 and at least one work assembly 4 of the agricultural working machine 2. In one implementation, "controlling" comprises one or both of regulating and controlling.

Furthermore, the driver assistance system 3 has a user interface 3c with a display unit 3d. In one implementation, the user interface 3c comprises a touchscreen monitor. Using user interface 3c, states can be displayed. Alternatively, or in addition, an operator may select or make settings of the control for the at least one work assembly 4 and/or the driving function.

Furthermore, the driver assistance system 3 has an interface 8 for communicating, such as via one or more network (s) 18, with an external computer unit 9 that is arranged remotely (e.g., remote as in one or both of physically external to the agricultural working machine 2 or necessitating wireless communication) from the agricultural working machine 2 and through which data may be exchanged between the driver assistance system 3 and the external computer unit 9. As discussed further below, the one or more network(s) 18 may comprise wired and/or wireless networks, such as cellular, Wi-Fi, and the Internet. In this regard, the external computer unit 9 may comprise a cloud server sitting on and communicating via the Internet. In one implementation, the exchange can be unidirectional (e.g., solely from the external computer unit 9 to the driver assistance system 3; solely from the driver assistance system 3 to the external computer unit 9). In another implementation, a bidirectional exchange occurs (e.g., from the external computer unit 9 to the driver assistance system 3 and from the driver assistance system 3 to the external computer unit 9). In one implementation, the exchange is at least partly wireless, such as, for example, via a mobile phone network and/or a WLAN (which in one implementation may at least partly include communication via the Internet).

In one implementation, data are transmitted from the external computer unit 9 via the interface 8 to the driver assistance system 3 during the work process of the agricultural working machine 2, and the control strategy for performing the work process is selected depending on the transmitted data. In this instance, the driver assistance system 3 selects the control strategy for the at least one work assembly 4. This enables extremely simple, fast and safe use of external data for the work process. In particular, this implementation may provide at least some relief to the operator B of the agricultural working machine 2. For example, in one implementation, the driver assistance system 3 may automatically select the control strategy depending on the data transmitted from the external computer unit 9, may output the selected control strategy for review by the operator B, and may then use the selected control strategy following acknowledgment by the operator B. As another example, a specific strategy may comprise "maximization of throughput"; thus, in one implementation, the external computer unit 9 may transmit data tailored to this specific strategy so that the driver assistance system may better implement this specific strategy.

Providing the set of rules 7 in the driver assistance system 3 and transmitting external data to the driver assistance system 3 (which then selects the control strategies from the saved set of rules 7 depending on the transmitted data) make it possible to act on the work process easily and with a narrow data transmission bandwidth. Since the driver assistance system 3 includes the control intelligence, the driver assistance system 3 may select the control strategy based on the external data selected. In this regard, the driver assistance system 3 remains in control and is the selector of the control strategy.

In one implementation, "selecting the control strategy" may comprise a selection of a saved control strategy, and/or a parameterization of a saved control strategy of the set of rules 7.

In this instance, the agricultural working machine 2 has at least one sensor 10 whose measured values are monitored using a sensor monitor 11. The sensor 10 may, for example, comprise a grain sensor 12 that is configured to detect a broken grain portion and/or a non-grain portion. In this implementation, the driver assistance system 3 includes a sensor monitor 11 in order to receive and thereafter evaluate the measured values from the sensor 10. The driver assistance system 3 may select the control strategy for performing the work process depending on the measured values. In one implementation, the driver assistance system 3 monitors the measured values cyclically, such as continuously. Further, the driver assistance system 3 may select the control strategy depending on one or both of the measured values and the data transmitted by the external computer unit 9.

Different control strategies may have different inputs, such as different data to be transmitted. As one example, a control strategy may be dependent on the environment of the agricultural working machine 2. In particular, the driver assistance system may select a certain control strategy to perform the work process, with implementation of the control strategy dependent on a certain type of data, such as environmental data. In this regard, this certain type of data, such as environmental data indicative of the environment of the agricultural working machine 2 performing the work process, may be transmitted to the driver assistance system in order to implement the selected work strategy performing the process. Types of environmental data include any one, any combination, or all of: weather data (e.g., any one, any combination or all of: the current weather, the weather forecast, or the preceding weather); the crop type; the crop growth; or the plant population.

In addition or alternatively, a control strategy may be dependent on other types of data. For example, the driver assistance system may select a control strategy that is dependent on cloud data as input. In this regard, the data selected for transmission, dependent on the selected control strategy, may include any one, any combination, or all of: cloud data; setting guidelines for work assemblies 4; setting guidelines for a reference machine; fleet data (e.g., agricultural working machines of the same type and/or agricultural working machines of a different type); or the like.

In one implementation, cloud data comprises data that are provided by a cloud service. A "cloud service" may comprise the provision of IT infrastructure, such as a storage space, computer capacity and/or application software via the Internet. This is generally offered as a service. "Setting guidelines" may comprise references and/or work instructions for setting the agricultural working machine 2. Fleet data may comprise status data and/or order data on a plurality of agricultural working machines 2. These can, for example, comprise data on work orders that are pending and to be processed and/or orders being processed, and/or a location of the respective agricultural working machine 2.

As still another example, the data for transmission (selected based on the selected control strategy for performing the work process) may comprise any one, any combination, or all of: data from big data analyses; data from farm management software; or data from crew management software. Data from big data analyses comprise data that were obtained using an analysis of mass data, such as unstructured mass data in various formats. Hidden patterns and correlations in the mass data may be discovered by the analysis. These patterns and correlations may be usefully saved in the data from the big data analyses. Data from farm management software comprise data that are used and/or processed for operating and managing an agricultural business. These comprise, for example, crop data. Crew management software comprises software by means of which a plurality of agricultural working machines (e.g., fleet) are guided and/or monitored. Data from crew management software may comprise data on a work order for an agricultural working machine 2, and/or setting guidelines for processing a work order. In particular, these data may comprise a division of a crop into partial crops that are processed by different agricultural working machines 2.

As yet another example, the data for transmission (selected based on the selected control strategy for performing the work process) may comprise assembly settings. The driver assistance system 3 may account for the assembly settings, with the driver assistance system 3 also selecting the control strategy for performing the work process depending on these assembly settings.

As yet another example, the data for transmission (selected based on the selected control strategy for performing the work process) may comprise additional data, such as the above-described type that do not comprise any assembly settings. In particular, the transmitted data depending on which the control strategy is selected can also generally not comprise any assembly settings.

Figure 2:
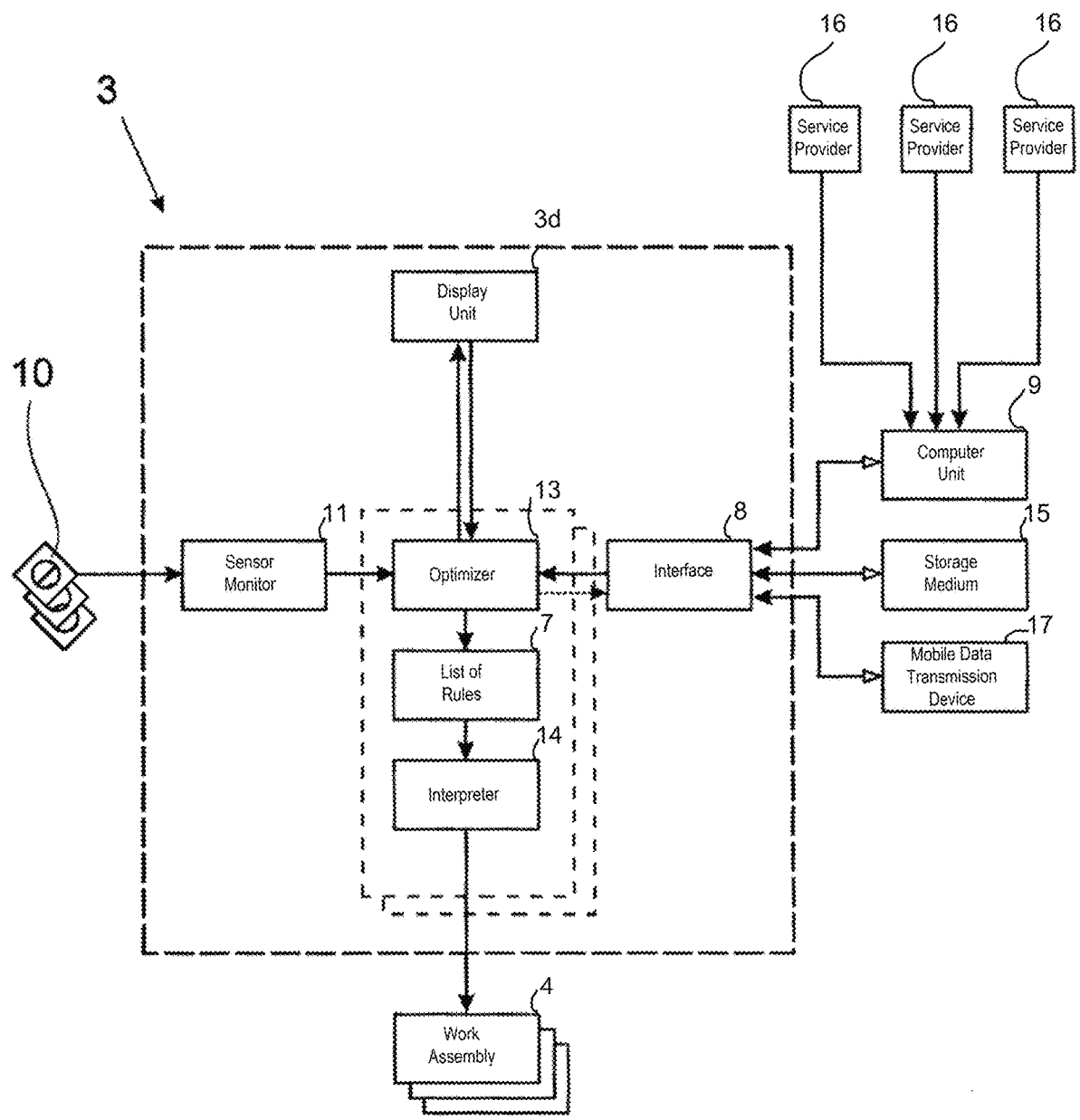
FIG. 2 shows a schematic representation of the driver assistance system.

In one implementation, the transmitted data and/or the measured value data may be input to the optimization process for the work process in the driver assistance system 3. In a specific implementation, the external data are the only input, via the interface 8, to an optimizer 13. Alternatively, or in addition, the sensor data from the sensor monitor 11 are input to the optimizer 13. In this case, the optimizer 13 selects a control strategy from the set of rules 7 and parameterizes it (see FIG. 2) using an optimization algorithm that may include as inputs and be dependent on one or both of the transmitted data and the sensor data.

In one implementation, an interpreter 14, using the selected control strategy, adjusts at least one assembly parameter of the at least one work assembly 4. In a specific implementation, the assembly parameter is then shifted or modified (such as continuously shifted or continuously modified) during the work process depending on the measured values and using the selected control strategy, such as until a new control strategy is selected and/or parameterized.

This can, if applicable, be cyclical. The transmitted data may trigger the driver assistance system 3 to select the control strategy for performing the work process depending on the transmitted data and/or the measured values. In this case, the transmitted data represent a trigger for selecting the control strategy. In addition or alternatively, the driver assistance system may select a control strategy dependent on transmitted or yet to be transmitted data and/or measured values. Alternatively, the operator may trigger the selection of the control strategy. In this case, the operator B may initiate an optimization of the work process, and the driver assistance system 3 may select a control strategy based on transmitted data by using transmitted data, or by selecting and/or requesting data to be transmitted.

In one implementation, the driver assistance system 3 may use the data directly for the work process, such as with information for the operator B, (e.g., outputting the information on a display unit 3d of the driver assistance system 3 for the operator B to view), independent of whether the control strategy selection was triggered by the transmitted data and/or by operator B input. Alternatively, the driver assistance system 3 may display an optimization proposal after the driver assistance system 3 selects the control strategy for performing the work process depending on transmitted data. In this implementation, the driver assistance system 3 executes the optimization proposal only after a confirmation by the operator B or the expiration of a predetermined time (e.g., the driver assistance system 3 waits the predetermined time for operator B input; if after which there is no operator B input, the driver assistance system 3 executes the optimization proposal).

In one implementation, data may likewise be transmitted via the interface 8 from the agricultural working machine 2 to an external device (such as external computer unit 9 or another external device), For example, any one, any combination, or all of the following may be transmitted to the external device: measured data from the sensors 10; setting data from the at least one work assembly 4; or a parameterization of a control strategy (e.g., the control strategy currently being implemented). In this implementation, the agricultural working machine 2, such as driver assistance system 3, may arrange and combine the data prior to transport into a data record, and thereafter transfer the data record to the external device. In this way, transmitting the data to an external computer unit 9 enables a simplified and improved evaluation, and the derivation or identification of particularly suitable control strategies independent of the driver assistance system 3. In one implementation, the external computer unit 9 operates a telemetry service. With regard to the compiling and transmission of data, reference is made to EP 2 702 846 A2 (corresponding to US Patent Application Publication No. 2014/0062723, incorporated by reference herein in its entirety).

Furthermore, additional data relating to the driving function can be transmitted via the interface 8 between the driver assistance system 3 and the external computer unit 9. In one implementation, the external computer unit 9 transmits the data to the driver assistance system 3 via the interface 8 during the work process of the agricultural working machine 2, and driving functions for performing the work process are controlled depending on the transmitted data (e.g., the driver assistance system 3 may use the additional data transmitted from the external computer unit 9 to control driving functions in order to perform the work process). This may, for example, be routine information for the work process. Alternatively, or in addition, the driver assistance system 3 may transmit additional data to the external computer unit 9.

For example, the driver assistance system 3 may transmit the additional data relating to the driving function (and optionally with a compiled data record) to a telemetry service (which external computer unit 9 may be a part of).

Moreover, a storage medium 15 may transmit additional data via the interface 8 to the driver assistance system 3. In this regard, the driver assistance system 3 may also select the control strategy for performing the work process depending on the data transmitted by the storage medium 15. In one instance, the additional data transmitted by storage medium 15 may comprise order information and/or crop information.

In one implementation, the external computer unit 9 comprises a server remote from the agricultural working machine 2. The external computer unit 9 may, for example, be an external computer network. In this regard, the external computer unit 9 provides a backend in terms of processing functionality. For example, the external computer unit 9 may be in a computer center. In particular, the external computer unit 9 may operate a cloud service that provides the data to be transmitted, depending on which the control strategy is selected for performing the work process.

In one implementation, the external computer unit 9, such as the cloud service, generates the data to be transmitted depending on which the control strategy is selected, and transmits the data (which, in turn, is processed by the driver assistance system 3 in order to control one or more aspects of the agricultural working machine 2). In the context of this processing, the driver assistance system 3 may select the control strategy responsive to receipt of the data. The external computer unit 9, such as the cloud service, routes data from service providers 16 as the data to be transmitted, depending on which the control strategy is selected. As one example, a plurality of service providers may route data to the external computer unit 9; the external computer unit 9 may select a subset of the data sent from the plurality of service providers, based on the selected control strategy, to route to the driver assistance system 3. As another example, the external computer unit 9 may poll a subset of the plurality of service providers to obtain only the data needed to support the control strategy selected. In addition or alternatively, the external computer unit 9, such as the cloud service, may prepare data, which may comprise control strategy dependent data, transmitted by service providers 16 by means of an algorithm, and may transmit to the driver assistance system 3 the prepared data as the data to be transmitted depending on which control strategy is selected. The data provided by the service providers 16, which is transmitted by the external computer unit 9 or the cloud service to the driver assistance system 3, may contain any one, any combination, or all of: weather information; fleet information; crew information; or farm management information. For example, responsive to the external computer unit 9 determining that only weather information and fleet information are necessary for the selected control strategy, the external computer unit 9 may poll only the service providers that supply weather information and fleet information in order to route the weather information and the fleet information to the driver assistance system 3.

Alternatively, the external computer unit 9 may be an Internet-capable mobile data transmission device 17. This provides the data to be transmitted, depending on which the control strategy for performing the work process is selected.

Furthermore, the system may include a mobile data transmission device 17 on which external data are selectable as the data to be transmitted that are transmitted to the driver assistance system 3 for selecting the control strategy. For example, mobile data transmission device 17 may include an interface to display the external data available for transmission. A person, such as operator B, may select a subset of the external data so that the mobile data transmission device 17 may transmit this selected subset of the external data to the external computer unit 9, such as the cloud service. In turn, the external computer unit 9 may transmit the selected subset of the external data to the driver assistance system 3.

Each of the items listed above may be associated with a single electronic device or may be combined within a single electronic device. Further, with regard to each separate electronic device, processing/memory functionality may be included.

The methods, devices, processing, circuitry, and logic described above may be implemented in many different ways and in many different combinations of hardware and software. As discussed above, computing unit 3b and memory 3a are configured to process data and store data, respectively. Computing unit 3b may comprise a microprocessor. Though computing unit 3b and memory 3a are depicted as separate elements, they may be part of a single machine, which includes a microprocessor (or other type of controller) and a memory unit. The microprocessor and memory unit are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions, which may comprise computer-readable instructions, may implement the functionality described herein (such as the functionality of driver assistance system 3 and external computer unit 9) and may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

LIST OF REFERENCE NUMBERS

1 System
2 Agricultural working machine
3 Driver assistance system
3a Memory
3b Computing unit
3c User interface
3d Display unit
4 Work assembly
5 Threshing system
5a Threshing drum
5b Threshing concave
6 Separating device
7 List of rules
8 Interface
9 Computer unit
10 Sensor
11 Sensor monitor
12 Grain sensor
13 Optimizer
14 Interpreter
15 Storage medium
16 Service provider
17 Mobile data transmission device
18 Network(s)
B Operator

The invention claimed is:
1. An agricultural working machine comprising:
at least one working assembly; and
a driver assistance system comprising:
  a processor;
  at least one memory configured to store rules indicative of a plurality of control strategies; and
  an interface configured to communicate with an external server, the external server sitting on and communicating via the Internet and remote from the agricultural working machine;
wherein the driver assistance system is configured to communicate, via the interface, with the external server remote from the agricultural work machine in order for the driver assistance system to receive external data, during a work process, from the external server; and
wherein the driver assistance system is configured to:

receive, from the external server, the external data, the external data previously obtained by the external server via the Internet from at least one information provider;
automatically select, based on the external data, at least one control strategy from the plurality of control strategies; and
control driving functions of the agricultural working machine and control the at least one working assembly based on the at least one control strategy in order to perform the work process.

2. The agricultural working machine of claim 1, further comprising:
at least one sensor configured to generate measured values; and
a sensor monitor configured to monitor the measured values;
wherein the driver assistance system is configured to select the at least one control strategy from the plurality of control strategies for performing the work process based on the received external data and the measured values.

3. The agricultural working machine of claim 1, wherein the received external data comprises environmental information indicative of environment of the agricultural working machine; and
wherein the driver assistance system is configured to select the at least one control strategy, from the plurality of control strategies based on the environmental information, for the work process.

4. The agricultural working machine of claim 1, wherein the received external data is sent by the external server based on the at least one control strategy selected by the driver assistance system;
wherein the external server includes a plurality of available data; and
wherein the external server is configured to select the external data to send as a subset of the plurality of available data based on the at least one control strategy selected by the driver assistance system.

5. The agricultural working machine of claim 4, wherein the received external data comprises at least one of: cloud data; setting guidelines for the agricultural working machine; setting guidelines for a reference machine; or fleet data.

6. The agricultural working machine of claim 1, further comprising:
at least one sensor configured to generate measured values; and
a sensor monitor configured to monitor the measured values;
wherein the driver assistance system comprises an optimizer; and
wherein the optimizer inputs the received external data and the measured values and selects the at least one control strategy from the plurality of control strategies based on both the measured values and on the received external data.

7. The agricultural working machine of claim 1, further comprising:
at least one sensor configured to generate measured values; and
a sensor monitor configured to monitor the measured values;
wherein responsive to inputting the received external data, the driver assistance system is triggered to select, based on both the received external data and the measured values and from the plurality of control strategies, the at least one control strategy for performing the work process.

8. The agricultural working machine of claim 1, wherein the driver assistance system includes a user interface; and
wherein responsive to receiving input from an operator via the user interface, the driver assistance system is triggered to select, based on the received or yet to be received external data, the at least one control strategy for performing the work process.

9. The agricultural working machine of claim 1, wherein the driver assistance system is further configured to transmit data to the external server, the data comprising a compiled data record of a driving function of the agricultural working machine.

10. A system comprising:
an external server sitting on and communicating via the Internet; and
an agricultural working machine, the agricultural working machine comprising:
at least one working assembly; and
a driver assistance system comprising:
a processor;
at least one memory configured to store rules indicative of a plurality of control strategies; and
an interface configured to communicate with the external server,
the external server remote from the agricultural working machine;
wherein the driver assistance system is configured to communicate, via the interface, with the external server in order for the driver assistance system to receive external data, during a work process, from the external server; and
wherein the driver assistance system is configured to:
receive, from the external server, the external data, the external data previously obtained by the external server via the Internet from at least one information provider;
automatically select, based on the external data, at least one control strategy from the plurality of control strategies; and
control driving functions of the agricultural working machine and control the at least one working assembly based on the at least one control strategy in order to perform the work process.

11. The system of claim 10, wherein the external server is configured to access a plurality of sources of data;
wherein the external server is configured to select a subset of the plurality of sources of data based on the at least one control strategy selected for performing the work process;
wherein responsive to selecting the subset of the plurality of sources of data, the external server receives control strategy dependent data; and
wherein the external server is configured to transmit the control strategy dependent data to the driver assistance system.

12. The system of claim 11, wherein the driver assistance system is configured to select the at least one control strategy based on the control strategy dependent data transmitted from the external server.

13. The system of claim 12, wherein the plurality of sources of data comprises a plurality of service providers; and
wherein the external server is configured to prepare data from the subset of the plurality of service providers using an algorithm, and to transmit the prepared data to the driver assistance system as the data to be transmitted depending on which of the at least one control strategy is selected.

14. The system of claim 10, further comprising a mobile data transmission device on which the external data is selected as data to be transmitted to the driver assistance system.

15. The agricultural working machine of claim 1, wherein the driver assistance system is triggered to select the at least one control strategy responsive to receipt of the external data.

16. The agricultural working machine of claim 1, wherein the driver assistance system is further configured to output, via a user interface to an operator of the agricultural working machine, the at least one control strategy selected; and wherein, responsive to receiving acknowledgement of the at least one control strategy selected, the driver assistance system is configured to control driving functions of the agricultural working machine and control the at least one working assembly based on the at least one control strategy selected.

17. The agricultural working machine of claim 1, wherein the plurality of control strategies include different external data for implementation; and wherein the external data is selected for transmission to the driver assistance system in order for the driver assistance system to implement the at least one control strategy selected.

18. The agricultural working machine of claim 3, wherein the environmental information comprises at least one of: weather data; crop type; crop growth; or plant population.

19. The agricultural working machine of claim 3, wherein the environmental information comprises weather data.

20. The agricultural working machine of claim 7, wherein the driver assistance system is triggered to select the at least one control strategy responsive to receipt of the external data.

* * * * *